United States Patent [19]

Kolb et al.

[11] 3,999,977
[45] Dec. 28, 1976

[54] METHOD FOR CONTROLLING THE INJECTION OF FLUX INTO A STEELMAKING VESSEL AS A FUNCTION OF PRESSURE DIFFERENTIAL

[75] Inventors: William A. Kolb, Forest Hills Borough; Michael J. Papinchak, Plum Borough, both of Pa.

[73] Assignee: United States Steel Corporation, Pittsburgh, Pa.

[22] Filed: Jan. 31, 1975

[21] Appl. No.: 546,177

Related U.S. Application Data

[62] Division of Ser. No. 354,610, April 25, 1973, Pat. No. 3,871,633.

[52] U.S. Cl. .................................... 75/51; 75/52; 75/60
[51] Int. Cl.[2] ........................................ C21C 5/30
[58] Field of Search .................... 75/51, 52, 60

[56] References Cited
UNITED STATES PATENTS

| | | | |
|---|---|---|---|
| 2,906,616 | 9/1959 | Allard | 75/51 |
| 2,979,393 | 4/1961 | Hener | 75/51 |
| 3,089,767 | 5/1963 | Rinesch | 75/51 |
| 3,771,998 | 11/1973 | Knuppel | 75/52 |

*Primary Examiner*—Peter D. Rosenberg
*Attorney, Agent, or Firm*—David S. Urey

[57] ABSTRACT

This invention is directed to a method and apparatus for controlling the injection of flux into a steelmaking vessel as a function of the differential pressure between the flux containing tank and the main conduit which supplies oxygen to the tuyeres of the steelmaking vessel in the Q-BOP process. A branch conduit diverts a portion of the oxygen stream from the main conduit and flux from a pressurized flux-containing tank is injected into this secondary stream which secondary stream is then recombined with the main stream. The apparatus measures the pressure differential between the main conduit and the flux tank and also compares the actual flux injection rate with a preset reference rate; a voltage signal representing the measured pressure differential and one representing the comparison between the actual and reference rates are compared with each other to provide a signal for controlling oxygen supplied to and vented from the pressure tank to vary the differential pressure between the primary conduit and the tank and thereby control the rate of flux injection into the secondary conduit as a function of this pressure differential.

The apparatus also measures the amount of flux injected into the secondary conduit and shuts off the supply when the measured amount equals a preset desired amount.

9 Claims, 13 Drawing Figures

METHOD FOR CONTROLLING THE INJECTION OF FLUX INTO A STEELMAKING VESSEL AS A FUNCTION OF PRESSURE DIFFERENTIAL

This is a division of application Ser. No. 354,610, filed Apr. 25, 1973, now U.S. Pat. No. 3,871,633, granted on Mar. 18, 1975.

BACKGROUND OF THE INVENTION

The disclosure relates to steelmaking and more particularly to a method and apparatus for controlling the rate and amount of injection of flux into a steelmaking vessel as needed. Still more particularly, this disclosure relates to a method and apparatus for controlling the injection of flux into a steelmaking furnace in a Q-BOP process utilized in a converter, electric furnace, open hearth furnace, hot metal mixer and the like. The basic Q-BOP process itself is disclosed in U.S. Pat. No. 3,706,549 issued Dec. 19, 1972 to H. Knuppel et al for "Method for Refining Pig Iron into Steel".

In a conventional BOP process for refining steel, oxygen is blown into a vessel through a lance positioned above the iron melt. While this process is satisfactory for many purposes, the mixing of the bath is not complete enough for some applications, iron losses are relatively high and only a portion of the oxygen issuing from the lance is utilized. The basic Q-BOP process for refining steel employs oxygen blown from below the surface of the melt resulting in better mixing, higher efficiency and less smoke generation than the conventional method. An improved process of this type is described in detail in co-pending U.S. Pat. application Ser. No. 312,173 of William A. Kolb et al filed Dec. 4, 1972, now U.S. Pat. 3,895,785 granted on July 22, 1975 and assigned to United States Steel Corporation.

A converter employed in carrying out this improved basic Q-BOP method comprises a tiltable vessel having a refractory lining and a bottom member provided with a plurality of nozzles, or tuyeres, extending through the bottom member. Each tuyere consists of a center jet through which oxygen flows during the refining portion of the process and an annulus jet concentrically surrounding the center jet through which a fuel gas flows to provide cooling for the tuyere.

Although oxygen is used in the center jet during the refining operation, various combinations of gases are required for purging or cooling the tuyeres and during other parts of the process, such as charging the converter, sampling the resulting melt, tapping the converter after the iron has been refined and during the transitional periods when the converter is being rotated to a position in which the next operation can take place. With the converter on its side during the charging, sampling and tapping operations, the tuyeres may be protected from melting by the introduction of gases, such as compressed air at the center jets and low pressure nitrogen at the annulus jets. When the vessel is being raised to its upright position for the refining operation, the pressure at the jets must be increased to assure that the molten metal will not enter the tuyeres, thereby blocking the openings and allowing them to come into contact with the steel and highly corrosive slag. Nitrogen, at a relatively high pressure, may be substituted for the compressed air during this portion of the cycle.

After the converter is in its upright position and located under a hood which carries the gases away, the refining operation is carried out by substituting oxygen for the nitrogen at the center jet and a fuel for the nitrogen at the annulus jet. The pressure during refining must be high enough to prevent the nozzles from becoming blocked or damaged by contact with the molten metal. During the refining operation, various types of fluxes, such as lime or the like, are injected into the oxygen flow being fed to the center jet of the tuyeres. These fluxes are, of course, basic to the steelmaking process and are employed in required amounts to give the finished steel its desired characteristics of strength, durability, malleability, or the like. In order that the finished steel will have the proper characteristics, it is necessary to accurately inject appropriate amounts of flux into the molten metal in the converter. To do this requires a control system which will allow accurate control of the flux being fed into the oxygen flow for injection into the molten metal bath through the tuyeres of the steelmaking vessel.

OBJECT OF THE INVENTION

The object of the present invention is to provide a control system, which relies on the pressure differential between the main oxygen injection line and the flux-containing tank to control the rate at which the flux material is fed into the oxygen line and thereby the amount of flux fed to the molten bath.

SUMMARY OF THE INVENTION

The present invention provides an apparatus for injecting flux into the molten metal in a steelmaking vessel employed in the Q-BOP steelmaking process utilized in a converter, electric furnace, open hearth, hot metal mixer or the like. In this invention, the flux is stored in a tank and is injected into the oxygen stream in a controlled manner.

In the herein disclosed apparatus, a branch line is provided to divert a portion of the oxygen stream from the main line supplying oxygen to the tuyeres of the steelmaking vessel. A second portion of the oxygen stream is diverted to the flux storage tank to pressurize it in a controlled manner.

The operation of the apparatus of this invention is based on the principle that the rate at which flux is injected into the oxygen stream is dependent upon and directly proportional to the differential pressure between the tank and the main oxygen line for a given branch line flow. Therefore, by varying the differential pressure between the main line and the tank, the rate of flux injection may be varied proportionally.

The amount of pressure in the tank is a function of the differential pressure between the main oxygen supply conduit and the tank itself. This differential is measured by a differential pressure measuring unit coupled between the main oxygen line and the flux tank. The measured pressure differential is used to control the flow of oxygen into the tank from the main supply line and out of the tank through a valved vent line to adjust the tank pressure. The rate at which flux is injected into the oxygen stream in the branch line is controlled by pressure in the tank.

DESCRIPTION OF THE PREFERRED EMBODIMENT

Main Oxygen Line Flow Control

Figure 1:
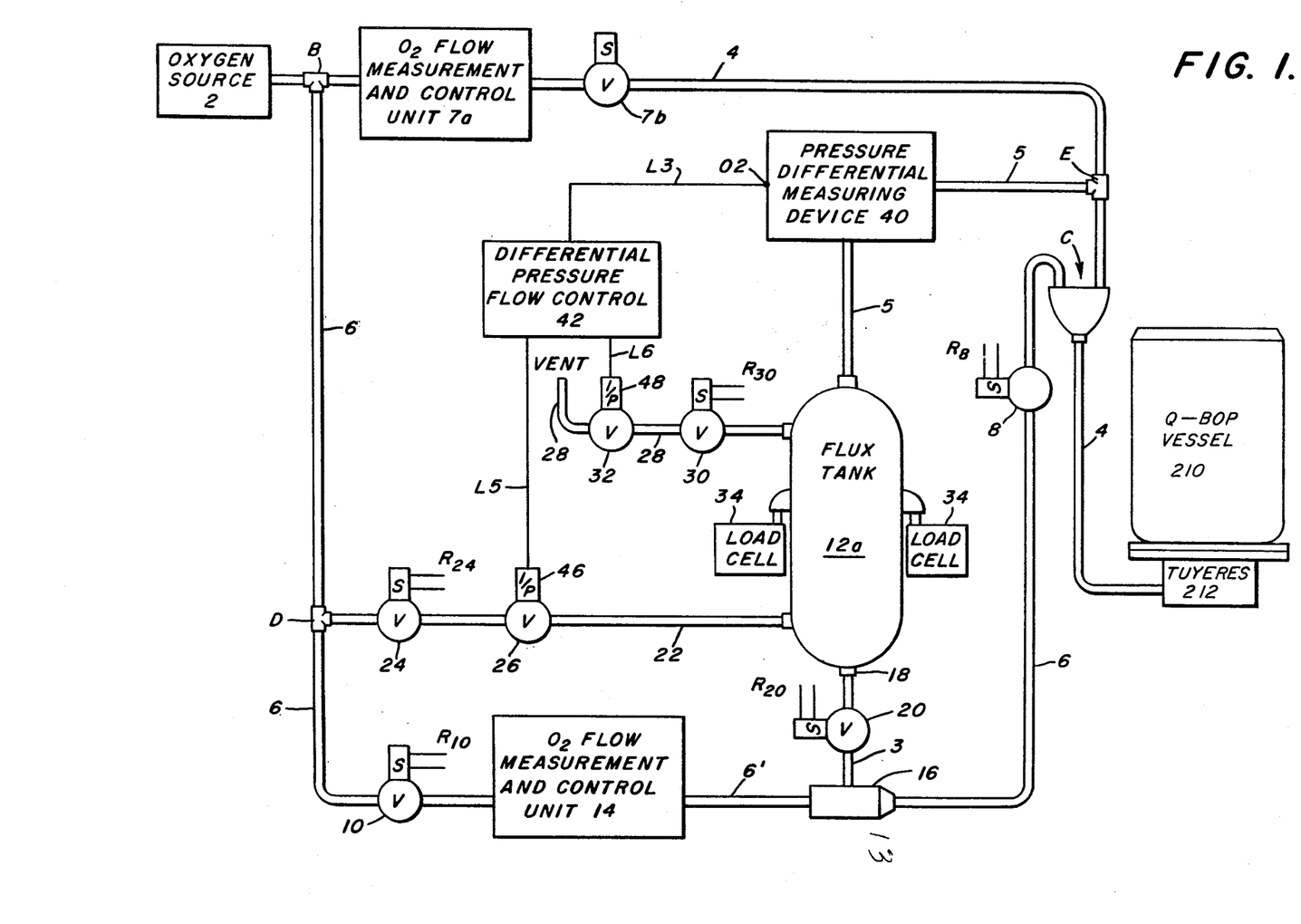
FIG. 1 shows a schematic piping diagram of the preferred embodiment.

As shown in the overall schematic piping diagram of FIG. 1, the apparatus of this invention for automatically controlling flux injection in the Q-BOP process includes a main oxygen source 2 which supplies oxygen to a main oxygen line 4 (FIG. 1) and a branch, or "diluter", line 6 (FIG. 1). The diluter line 6 branches off the main line 4 at a point B (FIG. 1) and recombines with the main line 4 at a junction point C (FIG. 1) located between the Q-BOP vessel 210 (FIGS. 1, 8) and the branch point B. Oxygen flow through the main line 4 is controlled by a flow measurement and control unit 7a (FIG. 1) coupled to a solenoid-operated block valve 7b (FIG. 1); this control system 7a, which is not a part of the present invention, is described in detail in the aforementioned Ser. No 312,173 U.S. Pat. No. 3,895,785 with particular reference to the correspondingly numbered portions of FIGS. 2 and 4 thereof.

Figure 2:
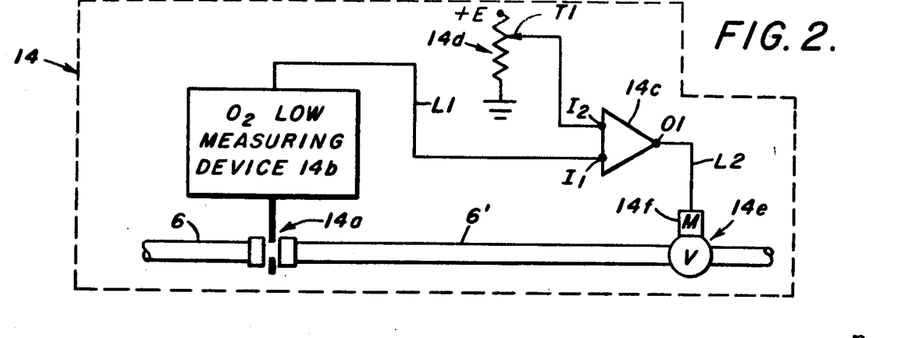
FIG. 2 shows the diluter line flow control apparatus.

Diluter Line Flow Control (FIGS. 1, 2)

Oxygen flow through the diluter line 6 (FIG. 1) is controlled by a solenoid-operated block valve 8 (FIG. 1), located in the diluter line 6 between a flux tank 12a (FIG. 1) and recombining point C, and by a solenoid-operated valve 10 (FIG. 1), located in branch line 6 between branch point B and the flux tank 12a. Between block valve 10 and flux tank 12a in the diluter line 6 is located a flow measurement and control unit 14 shown in detail in FIG. 2. As shown in FIG. 2, conduit 6' is a portion of the diluter line piping between block valve 10 and a flux injection nozzle 16. An orifice 14a (FIG. 2) is interposed in the upstream end of conduit 6' and an oxygen flow measuring device 14b is coupled to the orifice 14a. The flow measuring device 14b measures the flow in the diluter line 6 through the orifice 14a and generates a voltage proportional to the measured rate of oxygen flow. Flow measuring devices 14a for this purpose are available commercially and need not be described here in detail. The output of flow measuring device 14b is coupled via line L1 to one input I1 (FIG. 2) of a comparator 14c. The adjustable tap T1 (FIG. 2) of a potentiometer 14d (FIG. 2) is coupled to a second input I2 of comparator 14c. The fixed terminals of potentiometer 14d are connected across a D. C. source (FIG. 2) and the potentiometer 14d generates, at its adjustable tap T1, a signal representing the desired flow rate for a particular heat which has been manually preset by the operator. In normal operation this flow rate is generally preset to about 150 standard cubic feet per minute (scfm). The comparator 14c compares the input signals representing the measured flow rate and the desired flow rate and generates an output signal which is proportional to the difference between them. The output O1 of the comparator 14c is coupled via line L2 (FIG. 2) to a current operated control valve 14e (FIG. 2) through a current-to-air converter 14f (FIG. 2) to adjust the oxygen flow rate in the diluter line 6 (FIG. 1) to correspond to that which has been preset by the potentiometer 14d (FIG. 2). Again, these elements are all individually commercially available items.

Figure 3:
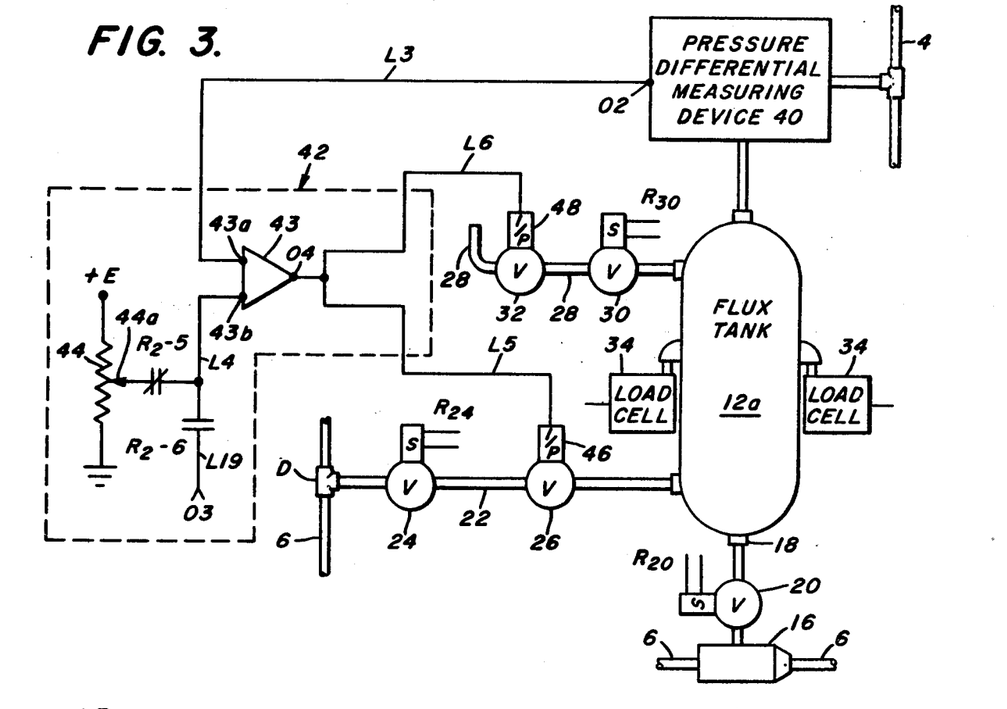
FIG. 3 shows the differential pressure measurement and control apparatus.
Figure 4:
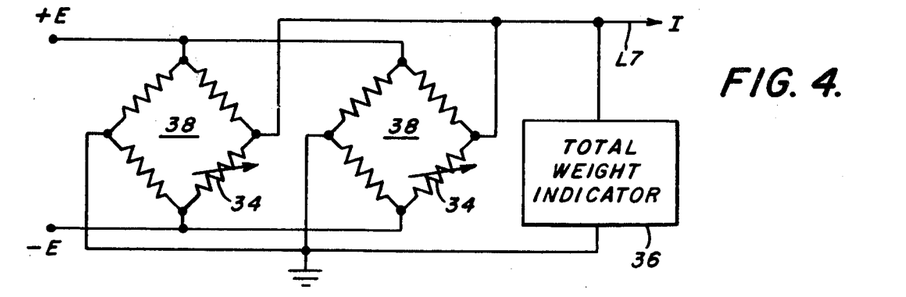
FIg. 4 shows the flux tank weight measuring apparatus.

Flux Tank Pressure and Feed Control (FIGS. 3, 4)

The flux tank 12a (FIGS. 1, 3) comprises a pressure vessel in which flux such as lime, or the like, is loaded by gravity feed or any other appropriate means. Flux tank 12a has, at its bottom, an outlet 18 (FIGS. 1, 3) coupled to the diluter line 6 through a solenoid-operated automatic block valve 20 (FIGS. 1, 3) and flux injection nozzle 16 (FIG. 1) in line 3. A pressurizing line 22 (FIGS. 1, 3) branches off the diluter line 6 at a point D (FIGS. 1, 3) between branch point B and block valve 10 and is coupled to the flux tank 12a to provide a supply of oxygen for pressurizing the tank 12a. Oxygen flow to the tank 12a is controlled by a solenoid-operated block valve 24 (FIGS. 1, 3) and a pressure-operated control valve 26 (FIGS. 1, 3) located in pressurizing line 22. Flux tank pressure is also controlled by a vent line 28 (FIGS. 1, 3) coupled to the tank 12a, which line 28 allows oxygen to vent out of the flux tank 12a through block valve 30 and control valve 32 located in series in vent line 28.

Inside the flux tank 12a the powdered flux is channeled toward the outlet 18 by a known air slide arrangement (not shown) which may consist of a screen grid which funnels the flux toward the outlet 18. A steady stream of gas from the pressurizing line 22 is fed over the screen grid to fluff the powdery flux and prevent it from caking while it is being fed toward and into the opening 18 by the pressure in the tank 12a.

The weight of the flux in the tank 12a is measured by several load cells 34 (FIGS. 1, 3, 4). These cells 34 are symmetrically placed around the outside of the tank 12a and are connected in parallel to a recorder 36 (FIG. 4) through corresponding impedance bridges 38 (FIG. 4), of which the load cells 34 form one leg, for indicating and recording the total weight of the tank 12a and flux remaining in the tank 12a at any given time. The load cell output constitutes one input of a system control unit 37, to be described more fully hereinafter with reference to FIGS. 5 and 6.

A known differential pressure measuring device 40 is connected by line 5 between tank 12a and the junction E of line 5 and line 4 (FIGS. 1, 3) and measures the difference in pressure between the main oxygen line 4 and the flux tank 12a and generates a voltage output which is proportional to the measured pressure difference. The voltage output 02 of the measuring device 40 is coupled via line L3 to a flow control unit 42 (FIGS. 1, 3). The control unit 42 includes a comparison circuit 43 (FIG. 3). The output 02 of measuring device 40 is coupled via line L3 to one input 43a (FIG. 3) of comparator 43; the other input 43b (FIG. 3) of the comparator 43 is coupled via line L4 to the variable tap 44a (FIG. 3) of a potentiometer 44 through normally closed contacts $R_2$-5 (FIG. 3) of relay $R_2$ and to an output terminal 03 (FIG. 3) of the system control unit (FIG. 6) through normally open contacts $R_2$-6 (FIG. 3, of relay $R_2$. Potentiometer 44 supplies a manually adjustable pressure setpoint reference signal and terminal 03 supplies a similar setpoint reference which varies in relation to the rate at which flux is injected into the diluter line 6 from the flux tank 12a. The manner in which the variable setpoint is obtained is described below with reference to FIG. 6. The output 04 of comparator 43 is connected via line L5 to current-operated control valve 26 in the pressurizing line 22 and via line L6 (FIG. 3) to current operated control valve 32 in the vent line 28 through current-to-pressure converters 46 and 48, respectively. These components are similar to the corresponding elements previously described with respect to the diluter line flow control loop (FIG. 2).

Valve Operation

Converters 46 and 48 are current operated devices and are connected in a series current loop; converter 46 operates control valve 26 when the current output of control unit 42 is in the 10–30 ma range and converter 48 operates control valve 32 in the 30–50 ma range. In the preferred embodiment, there is a dead band of 29–31 ma where the pressure differential conditions are effectively satisfied and both valves 26, 32 will be closed. This dead band helps to prevent valve chatter around the desired nominal. Thus when the pressure differential between the flux tank 12a and the main oxygen line 4 is compared with the reference setpoint to produce a 10–30 ma output from control unit 42, control valve 32 will remain closed and control valve 26 will be opened to allow oxygen to flow through the pressurizing line 22 into the flux tank 12a to increase the pressure in the tank 12a and thereby increase the pressure differential. Conversely, when a comparison of the pressure differential with the reference setpoint produces a 30–50 ma output from controller 42, valve 26 will be closed to halt the flow of oxygen into the tank 12a and valve 32 will be opened to allow the tank 12a to vent, thereby decreasing the pressure differential. For lime injection, the pressure of the tank 12a should always be higher than the reference point at the main oxygen line 4. When the comparison produces an output from controller 42 in the 29–31 ma range, both control valves 26, 32 will be closed and a steady state condition will be obtained.

Figure 8:
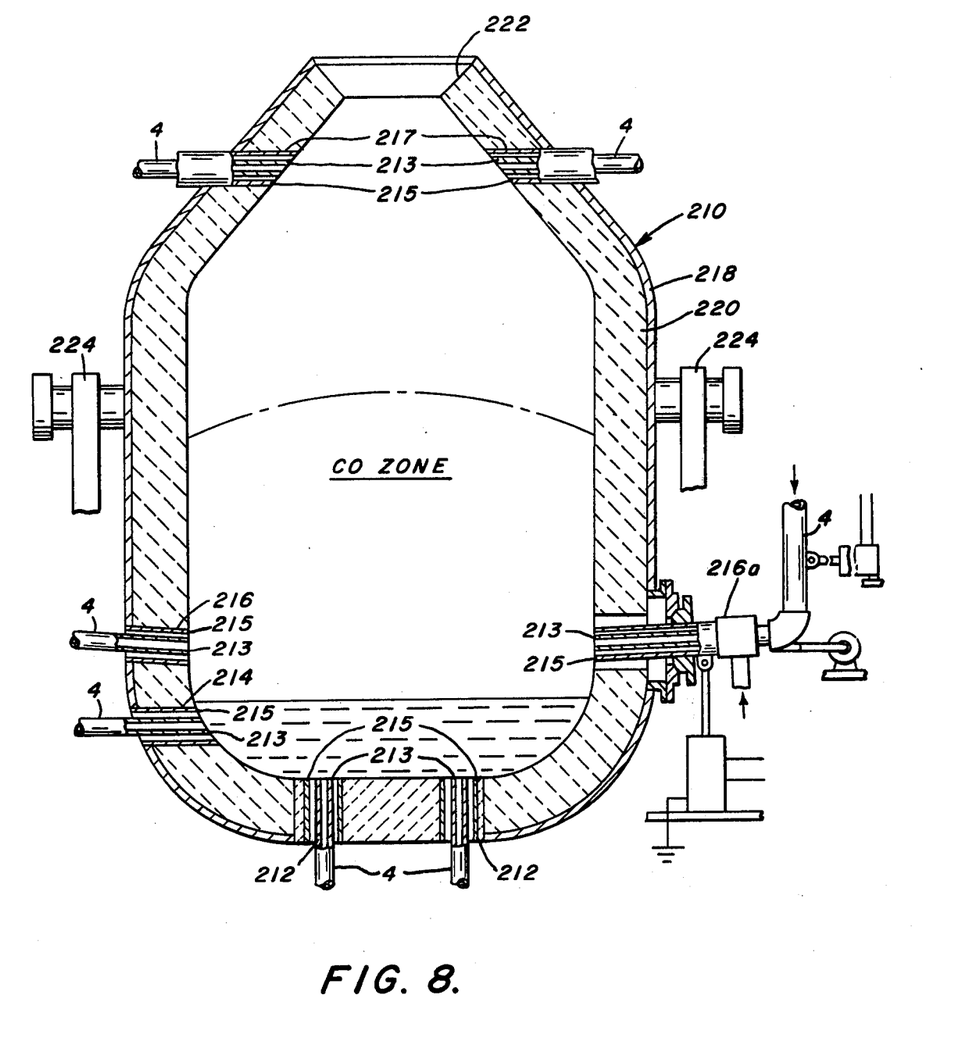
FIG. 8 is a vertical sectional view of a bottom blown oxygen converter showing a pair of submerged bottom tuyeres, a pair of side submerged tuyeres, and a pair of side tuyeres directed toward the carbon monoxide zone of the furnace.

The operation of the differential pressure measuring loop in controlling the pressurizing line control 26 and vent line control valve 32 relies on the principle that the rate of flux feed into the steelmaking vessel 210 (FIGS. 1, 8) from the flux-containing tank 12a is dependent upon and directly proportional to the differential pressure between the flux tank 12a and the main oxygen supply line 4 for a given flow rate in the diluter line 6. Thus the rate of flux feed is varied by varying the pressure differential between the tank 12a and the main oxygen line 4. In the Q-BOP process it is important that during a heat at least a minimum pressure be maintained in the oxygen supply line 4 in order to prevent the molten metal in the steelmaking vessel 210 (FIGS. 1, 8) from damaging the tuyeres 212 (FIGS. 1, 8). For this reason, in the herein described embodiment, the pressure differential between the main oxygen line 4 and the flux tank 12a is required to be constant for a given flux injection rate which can be adjusted by varying the pressure in the flux tank 12a with reference to the pressure in the main oxygen line 4.

Figure 5:
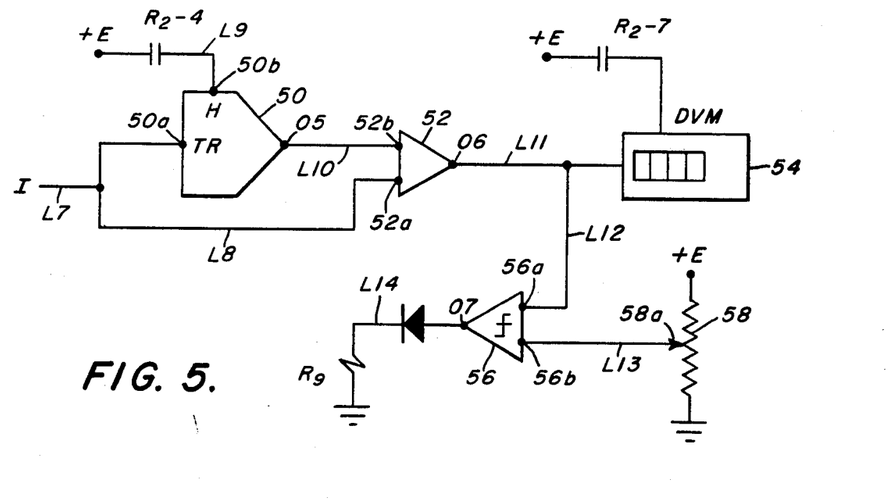
FIG. 5 shows the apparatus for controlling the total amount of flux injected into the oxygen stream.
Figure 6:
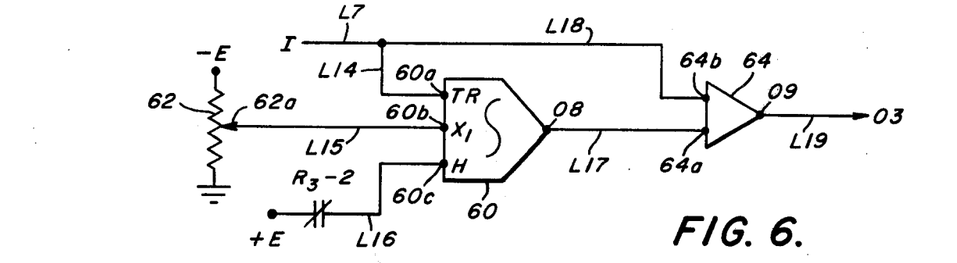
FIG. 6 shows the apparatus for controlling the rate of flow of flux into the diluter line.

Injection Control Unit (FIGS. 5, 6)

The flow of oxygen through the diluter line 6 and the feeding of flux into that line 6 from the flux tank 12a is controlled in part by a two-section control circuit shown in detail in FIGS. 5 and 6. The portion of the control circuitry shown in FIG. 5 is specifically directed to controlling the total amount of flux injected into the oxygen stream from the tank 12a by controlling the state of solenoid-operated block valve 20. The operation of this feed control circuit is based on the weight signal produced by the load cell bridge circuits described earlier with respect to FIGS. 3, 4.

In this aspect of the invention, the output I (FIGS. 4, 5) of the load cells 34 (FIGS. 1, 3, 4), representing the weight of the flux in tank 12a as well as the weight of the tank 12a itself, is coupled via line L7 to the signal input 50a of a track and hold amplifier 5C (FIG. 5) and also via line L8 to one input 52a of an adder/subtractor 52 (FIG. 5). The hold trigger input 50b (FIG. 5) of the track and hold amplifier 50 is coupled via line L9 to a source of voltage through normally open relay contacts $R_2$-4. The output 05 (FIG. 5) of track and hold amplifier 50 is coupled via line L10 to the second input 52b of adder/subtractor 52. The output 06 (FIG. 5) of adder/subtractor 52 is in turn coupled via line L11 to a digital voltmeter 54 calibrated to indicate the amount of flux which has left the flux tank 12a and been fed into the diluter line 6. The output 06 of adder/subtractor 52 is also coupled via line L12 to one input 56a of a comparator 56. These devices are all well known and are commercially available in modular form. An appropriately calibrated reference potentiometer 58 is coupled via line L13 through its adjustable tap 58a to a second input 56b of comparator 56 to provide a signal representing the total weight of flux which is desired to be fed into the diluter line 6 from tank 12a. In the preferred embodiment, the voltages compared in comparator 56 are opposite sign and the polarity of their sum is an indication of their relative magnitudes. The point of change in polarity provides a trigger for the high gain operational amplifier portion of the comparator 56 to cause its output voltage to swing from one extreme value to the other. The output 07 (FIG. 5) of the comparator 56 is coupled via line L14 to the energizing coil of a relay $R_9$. Relay $R_9$, when energized by the output from comparator 56, causes block valve 20 (FIGS. 1, 3) to close (in a manner to be described below) to shut off the flow of flux from tank 12a into diluter line 6.

Prior to the start of the injection operation, track and hold amplifier 50 is in its tracking mode so that its output 05 (FIG. 5) closely follows its input 50a. The output 06 (FIG. 5) of adder/subtractor 52 reflects this zero difference between its inputs 52a, 52b and the ouput 07 of comparator 56 is at the extreme value which prevents relay $R_9$ from being energized. When the flux injection operation is initiated, normally open relay contacts $R_2$-4 (FIG. 5) close to switch track and hold amplifier 50 into its holding mode to hold the last weight value measured by the load cell measuring circuit. As flux flows out of the tank 12a, the output signal I (FIG. 4) from the load cell circuit changes proportionally. This causes the output 06 (FIG. 5) of the adder/subtractor 52 to also change proportionally, with an increasing magnitude. When the magnitude of the output signal 06 (FIG. 5) from the adder/subtractor 52, appearing at input 56a of comparator 56, exceeds that of the output signal from the potentiometer 58, appearing at the other input 56b of comparator 56 and of opposite polarity from the first input 56a, the output signal 07 from the comparator 56 shifts to the other extreme value to energize relay $R_9$.

FIG. 6 illustrates the portion of the injection control unit which generates the variable remote setpoint signal input to the differential pressure control loop of FIG. 3 to thereby control the rate at which flux is injected into the oxygen stream. The output I (FIGS. 4, 5, 6) of the load cell circuit (FIG. 4) is coupled via line L14 to the tracking input 60a of a track and hold integrating amplifier circuit 60 which is also commercially available in modular form. The integrating function input 60b is coupled via line L15 (FIG. 6) to the adjustable tap 62a of a flux feed rate potentiometer 62 connected across the negative and common terminals of a source of D. C. voltage. The trigger input 60c (FIG. 6) of circuit 60 is coupled via line L16 to a source of positive voltage E through the normally closed contacts $R_3$-2 of relay $R_3$. When relay $R_3$ is de-energized, circuit 60 is in the tracking mode and its output signal 08 (FIG. 6) follows the measured weight signal appearing at tracking input 60a. When relay $R_3$ is energized, the normally closed contacts $R_3$-2 are opened and the circuit 60 is triggered to couple input 60b to flux feed rate potentiometer 62 in an integrating mode. The signal appearing on the tracking input 60a at the time the operating mode of circuit 60 is switched is held and forms the initial condition for the integration. Adjusting the tap 62a (FIG. 6) of potentiometer 62 results in a variation in the integration function of circuit 60. The rate of integration corresponds to the desired flux feed rate, as set by the appropriately calibrated potentiometer. Therefore, the desired rate of flux feed from tank 12a into diluter line 6 can be varied as required by the particular operating conditions.

The output 08 (FIG. 6) of circuit 60 is coupled via line L17 to one input 64a of a known comparison circuit 64, also available commercially in modular form. The other input 64b is coupled via line L18 to the output I of the load cell weight measuring circuit (FIG. 4). The output 09 (FIG. 6) of comparison circuit 64 is coupled via line L19 to the pressure setpoint input 43b (FIG. 3) of comparator 43 of the pressure differential control circuit 42 through the normally open contacts $R_2$-6 of relay $R_2$ (FIG. 3).

Figure 7:
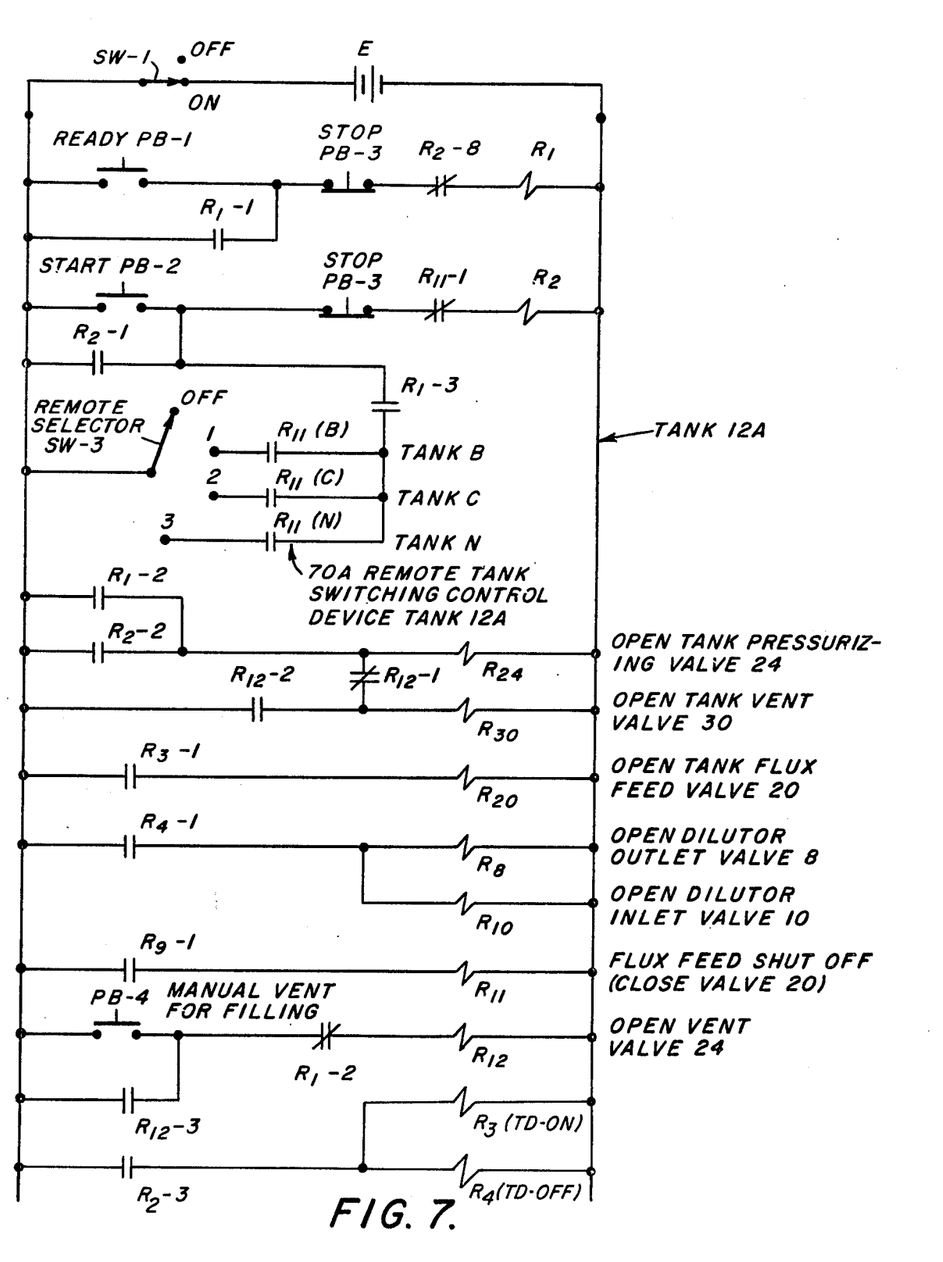
FIG. 7 is a schematic control diagram showing the operation of the system.
Figure 7A:
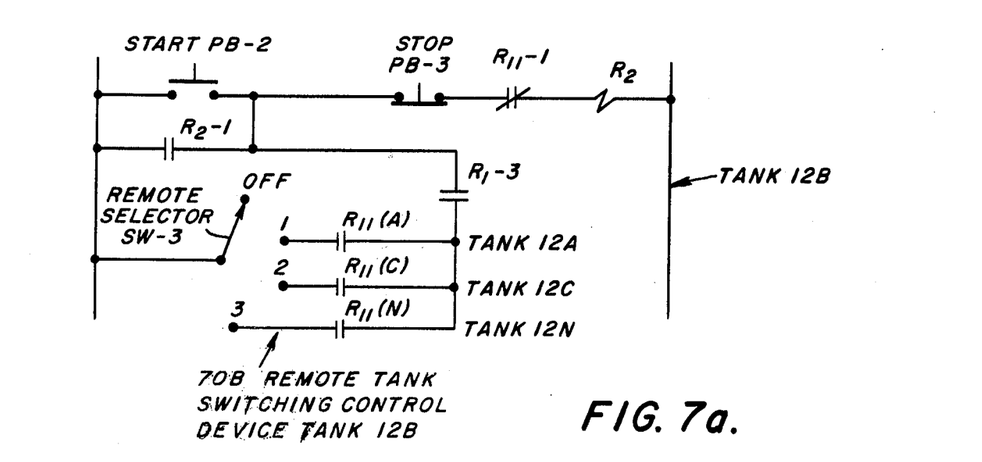
FIG. 7A is a fragmentary schematic control diagram showing how the apparatus of a first tank actuates the apparatus associated with the second tank.

Operation Control and Timing (FIGS. 7, 7A)

The operation of the control system of this invention will be described below with particular reference to the control diagrams of FIGS. 7 and 7A, in connection with the other figures.

Flux injection, according to this invention, is initiated when the operator presses the momentary-contact READY push button PB-1 (FIG. 7), located at the operator's console, to energize relay $R_1$ by connecting its coil across the voltage source E. Normally open relay holding contacts $R_1$-1 (FIG. 7) are connected across the contacts of push button switch PB-1 and are closed upon relay $R_1$ being energized to maintain relay $R_1$ in its energized state.

At the same time, normally open contacts $R_1$-2 are closed to pick up relays $R_{24}$ and $R_{30}$ (FIGS. 1, 3). Energizing relays $R_{24}$ and $R_{30}$ causes pressurizing line block valve 24 (FIGS. 1, 3) and vent line block valve 30 to open, thereby permitting oxygen to flow into and through the flux tank 12a to establish a controlled pressurization within the tank 12a by means of the heretofore described flux tank pressure control system (FIG. 3).

When pressurization of the flux tank 12a has been completed, the operator depresses the momentary-contact START push button PB-2 (FIG. 7) to energize relay $R_2$. Normally open holding contacts $R_2$-1, connected across the terminals of switch PB-2, are thereupon closed to maintain relay $R_2$ in its energized state after the operator releases switch PB-2. As a safety feature in the event the operator fails to pre-pressurize the flux tank 12a by first depressing the READY push button PB-1 (as described above) before initiating flux injection, normally open relay contacts $R_2$-2 are connected in parallel with contacts $R_1$-2 (FIG. 7) to pick up relays $R_{24}$ and $R_{30}$ when the START push button PB-2 is depressed. This will allow the tank 12a to pressurize while a steady flow is being established in the diluter line 6 during the delay period before relay $R_3$ (FIG. 7) picks up.

When relay $R_2$ (FIG. 7) is energized, normally open contacts $R_2$-3 (FIG. 7) close to pick up relay $R_3$ after a predetermined time delay, as indicated in FIG. 7 by the legend TD-ON. The closing of contacts $R_2$-3 (FIG. 7) also energizes relay $R_4$ which relay $R_4$ picks up with no measurable delay but is de-energized, upon the opening of contacts $R_2$-3, only after a predetermined delay, as indicated in FIG. 7 by the legend TD-OFF. Relay $R_3$ drops out with no measurable delay when contacts $R_2$-3 are opened.

When relay $R_2$ (FIG. 7) picks up, normally open contacts $R_2$-4 (FIG. 5) close to trigger track and hold amplifier 50 into its hold mode to hold the last reading of the weight measured by the load cell measuring circuit (FIG. 4), which reading is then compared in the adder/subtractor 52 with the current weight signal measured by the load cell circuit (FIG. 4) as flux is fed out of the tank 12a. At the same time, normally closed contacts $R_2$-5 (FIG. 3) open and normally open contacts $R_2$-6 (FIG. 3) close to switch the reference setpoint 43b (FIG. 3) of the tank pressure control unit 42 (FIG. 3) from the fixed reference of potentiometer 44 to the varying reference of terminal 03 (FIG. 6). Finally, normally open contacts $R_2$-7 (FIG. 5) close when relay $R_2$ is energized to reset the digital voltmeter 54 to zero at the start of the injection operation.

Energizing relay $R_4$ (FIG. 7) immediately upon the closing of contacts $R_2$-3 (FIG. 7) causes normally open contacts $R_4$-1 (FIG. 7) to close, thereby simultaneously picking up relays $R_8$ and $R_{10}$ (FIGS. 1, 7). Upon being energized, relays $R_8$ and $R_{10}$ open block valves 8 and 10 (FIG. 1), respectively, and provide a flow path for the oxygen from the main line 4 through diluter line 6, block valve 10, flow measurement and control unit 14 (FIG. 2), flux injection nozzle 16 (FIGS. 1, 3) and block valve 8 (FIG. 1) back to the main line 4 at recombining point C. After a predetermined time delay sufficient to establish a steady flow of oxygen through the diluter line 6, relay $R_3$ (FIG. 7) picks up, causing normally open contacts $R_3$-1 (FIG. 7) to close and pick up relay $R_{20}$ (FIGS. 1, 3). Energizing relay $R_{20}$ causes block valve 20 (FIGS. 1, 3) to open, permitting flux to flow out of the tank 12a and into the diluter line 6 by way of injection nozzle 16. Energizing relay $R_3$ also causes normally closed contacts $R_3$-2 (FIG. 6) to open and trigger track and hold integrating amplifier 60 (FIG. 6) out of its tracking mode and into its integrating mode.

After flux injection has been established by the just described steps, the rate of injection is controlled by means of the feed control system described earlier with reference to FIGS. 3 and 6. When the measured amount of flux injected into the oxygen stream 4 from the flux tank 12a reaches the desired total preset by the operator, the output of comparator 56 (FIG. 5) changes state to energize relay $R_9$ (FIG. 5) and close normally open contacts $R_9$-1 (FIG. 7), thus picking up relay $R_{11}$. When relay $R_{11}$ (FIG. 7) is energized, normally closed contacts $R_{11}$-1 (FIG. 7) will open to de-energize relay $R_2$. When relay $R_2$ drops out, contacts $R_2$-2 (FIG. 7) open, immediately dropping out relay $R_3$ and dropping out relay $R_4$ after a predetermined delay. When relay $R_3$ (FIG. 7) drops out, contacts $R_3$-1 (FIG. 7) open to de-energize relay $R_{20}$ (FIGS. 1, 3, 7) and close block valve 20 (FIGS. 1, 3) thereby shutting off the flow of flux from the tank 12a. For a period of time after valve 20 closes, determined by the delay time by relay $R_4$ (FIG. 7), valves 8 and 10 (FIGS. 1, 3) remain open to flush any residual amounts of flux out of the diluter line 6 and into the main oxygen line 4. After this delay, relay $R_4$ (FIG. 7) drops out and contacts $R_4$-1 open to de-energize relays $R_8$ and $R_{10}$, thereby causing block valves 8 and 10 (FIGS. 1, 3) to close and shut off the flow of oxygen through the diluter line 6.

In addition to the automatic shut-off provided by relays $R_9$ (FIG. 6) and $R_{11}$ (FIG. 7), the control system of this invention also allows the operator to manually stop the injection process by depressing a normally closed momentary contact STOP switch PB-3 (FIG. 7) to de-energize relay $R_2$ with the resulting timed closings of valves 20, 8 and 10 (FIGS. 1, 3), described above.

The system also includes a master switch SW-1 which must be in the ON position before any of the flux injection operations can be effected.

Remote Tank Switching Control Device 70b

Also shown in FIGS. 7, 7A is a remote tank switching control device 70b having a second apparatus tank 12b associated with tank 12a and tank 12b for energizing tank 12b when tank 12a has completed its cycle (FIG. 7).

When tank 12a has completed its cycle, relay $R_{11}$ (FIG. 7) becomes energized, thereby closing contacts $R_{11}(A)$ (FIG. 7A) and stopping the flow of flux from tank 12a by de-energization of relay $R_2$ (FIG. 7).

If tank 12b is in the ready position as evidenced by the energization of relay $R_1$ for tank 12b and the remote selector switch SW-3 for tank 12b is closed on position 1 (FIG. 7A), then relay $R_2$ (FIG. 7A) for tank 12b is energized and the fluid flow begins from tank 12b.

Similarly if relay $R_{11}$ for tank 12b is energized thus stopping the flux flow from tank 12b, flux flow from tank 12b ceases; if switch SW-3 for tank 12a (FIG. 7) is closed to postion 1 (FIG. 7), and if the tank 12a is in the ready position as evidenced by energization of relay $R_1$ for tank 12a (FIG. 7), then relay $R_2$ for tank 12a (FIG. 7) becomes energized and flux flow begins from tank 12a.

Each tank 12a, 12b has its own load cell weight measuring circuit 34 (FIG. 3) which would be coupled in an obvious manner to the injection control unit (FIGS. 5, 6) upon selection of the corresponding tank.

Manual Venting

When manually operated push button PB-4 (FIG. 7) is closed, relay $R_{12}$ for tank 12a is energized (if tank 12a is not in the ready position or start inject position as evidenced by energization of relay $R_1$ for tank 12a). Energization of relay $R_{12}$ for tank 12a opens contacts $R_{12}$-1 and closes contacts $R_{12}$-2, thus energizing relay $R_{30}$ for tank 12a and opening tank vent valve 30 for tank 12a to relieve the pressure on tank 12a so that it can be filled with flux by gravity flow.

ALTERNATIVE EMBODIMENTS

From a consideration of FIG. 8, it will be apparent that the present invention may be employed with a bottom blown converter 210 having bottom submerged tuyeres 212, the side submerged tuyere 214. side tuyeres 216, 216a directed toward the carbon monoxide zone (CO zone) of the converter 210 and mouth tuyeres 217. Movable side tuyere 216a is of the type disclosed in U.S. pat. application Ser. No. 309,018 filed Nov. 24, 1972 by William A. Kolb et al. for "Apparatus for and Method of Optimum Burning of Carbon Monoxide in a Converter" and assigned to the same assignee as the present invention. This bottom blown converter 21 has a shell 218 provided with a refractory lining 220 and a mouth 222 and is rotatable on trunnions 224. The tuyeres 212, 214, 216, 216a, 217 are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215 a shroud gas, such as propane, natural gas, light fuel oil or the like.

Figure 9:
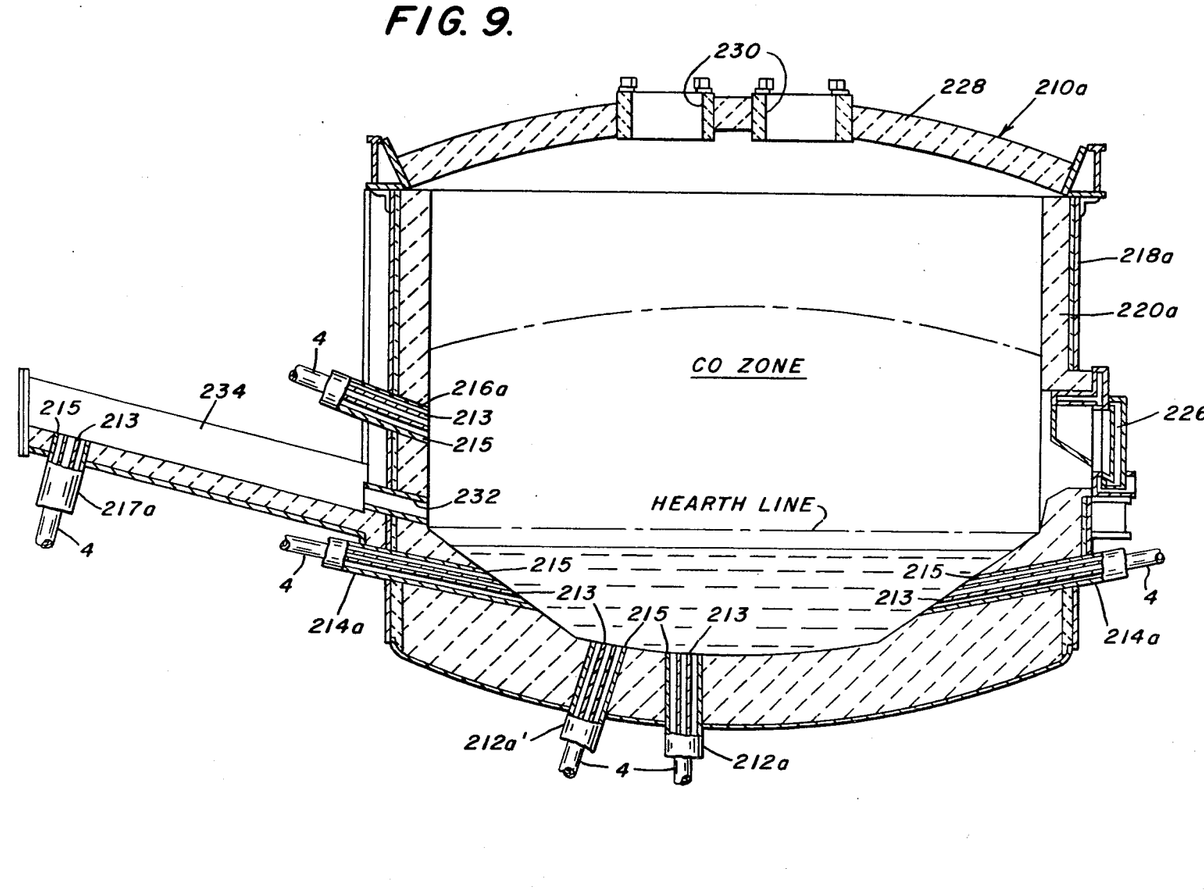
FIG. 9 is a vertical sectional view of an electric-arc steelmaking furnace showing a bottom vertical and bottom inclined submerged tuyere, a pair of side submerged tuyeres and a side tuyere directed toward the carbon monoxide zone of the furnace.

As shown in FIG. 9, the present invention is also applicable to a Heroult Type electric-arc steelmaking furnace 210a provided with a vertical and inclined bottom submerged tuyere 212a and 212a', side submerged tuyeres 214a, a side tuyere 216a directed toward the carbon monoxide zone (Co zone) of the furnace 210a and a spout or mouth tuyere 217a. This electric arc steelmaking furnace 210a has a shell 218a provided with a refractory lining 220a, a side door 226, a refractory roof 228 provided with electrode holes 230, a tap hole 232, and a pouring spout 234 extending from the tap hole 232. The tuyeres 212a, 212a', 214a, 216a, 217a are adapted to carry in an inner pipe 213 either a fluid alone, such as oxygen, air, aragon, or mixtures thereof, or entrained pulverized additives therein such as a fluxing agent (burned lime (CaO) or the like), a liquefying agent (fluorspar (CaF$_2$) or the like), or a blocking or deoxidizing agent (ferro manganese or the like), and in an outer pipe 215, a shroud gas, such as propane, natural gas, light fuel oil or the like.

Figure 10:
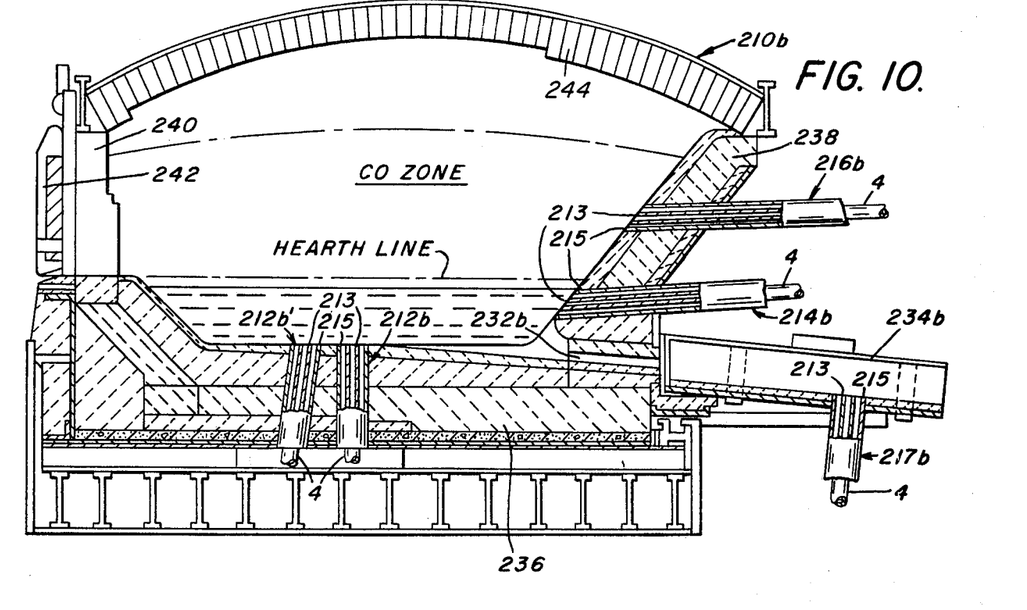
FIG. 10 is a vertical sectional view of an open hearth furnace utilizing a vertical and inclined bottom submerged tuyere, a side submerged tuyere and another side tuyere directed toward the carbon monoxide zone of the furnace.

In addition, the present invention may be employed as shown in FIG. 10 with the open hearth furnace 210b having the vertical and inclined bottom submerged tuyeres 212b and 212b', the side submerged tuyere 214b, the side tuyere 216b directed toward the carbon monoxide zone (CO zone) of the furnace 210b and the spout tuyere 217b. This open hearth furnace 210b includes a refractory lined bottom 236, a refractory lined sloping back wall 238, a refractory lined front wall 240, a charging door 242 in the wall 240, and a refractory lined roof 244. A tap hole 232b opposite the charging door 242 leads to a pouring spout 234b. The tuyeres 212b, 212b', 214b, 216b, 217b are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar (CaF$_2$) or the like), or a blocking or deoxidizing agent (ferro manganese or the like) and in an outer pipe 215, a shroud gas, such as propane, natural gas, light fuel oil or the like.

Figure 11:
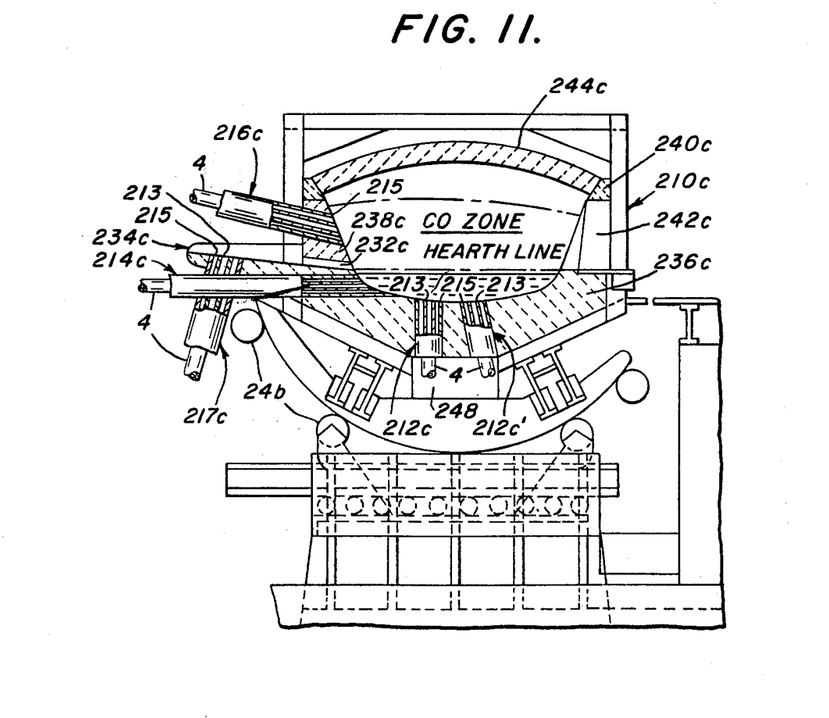
FIG. 11 is a vertical sectional view of a tiltable open hearth furnace having a vertical and an inclined bottom submerged tuyere, a side submerged tuyere and side tuyere directed toward the carbon monoxide zone of the furnace.

Again as shown in FIG. 11, the present invention may be employed with a tilting open hearth furnace 210c mounted on rollers 246 arranged in a circular path for providing rotation on the longitudinal axis of the furnace 210c for pouring the refined steel through a tap hole 232c and a pouring spout 234c. As shown in FIG. 11, the tiltable open hearth furnace 210c has vertical and inclined bottom submerged tuyeres 212c and 212c' connected through a blast box 248 to the line 4 shown in FIG. 1. In addition, a submerged side tuyere 214c, a side tuyere 162c directed toward the carbon monoxide zone (CO zone) of the furnace 210c and a spout tuyere 217c are employed. The tiltable open hearth furnace 210c has a refractory lined bottom 236c, refractory lined back wall 238c, refractory lined front wall 240c (provided with a charging door 242c) and a refractory lined roof 244c. The tuyeres 212c, 212c', 214c, 216c, 217c are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar (CaF$_2$) or the like), or a blocking or deoxidizing agent (ferro manganese or the like), and in an outer pipe 215, a shroud gas, such as propane, natural gas, light fuel oil or the like.

Figure 12:
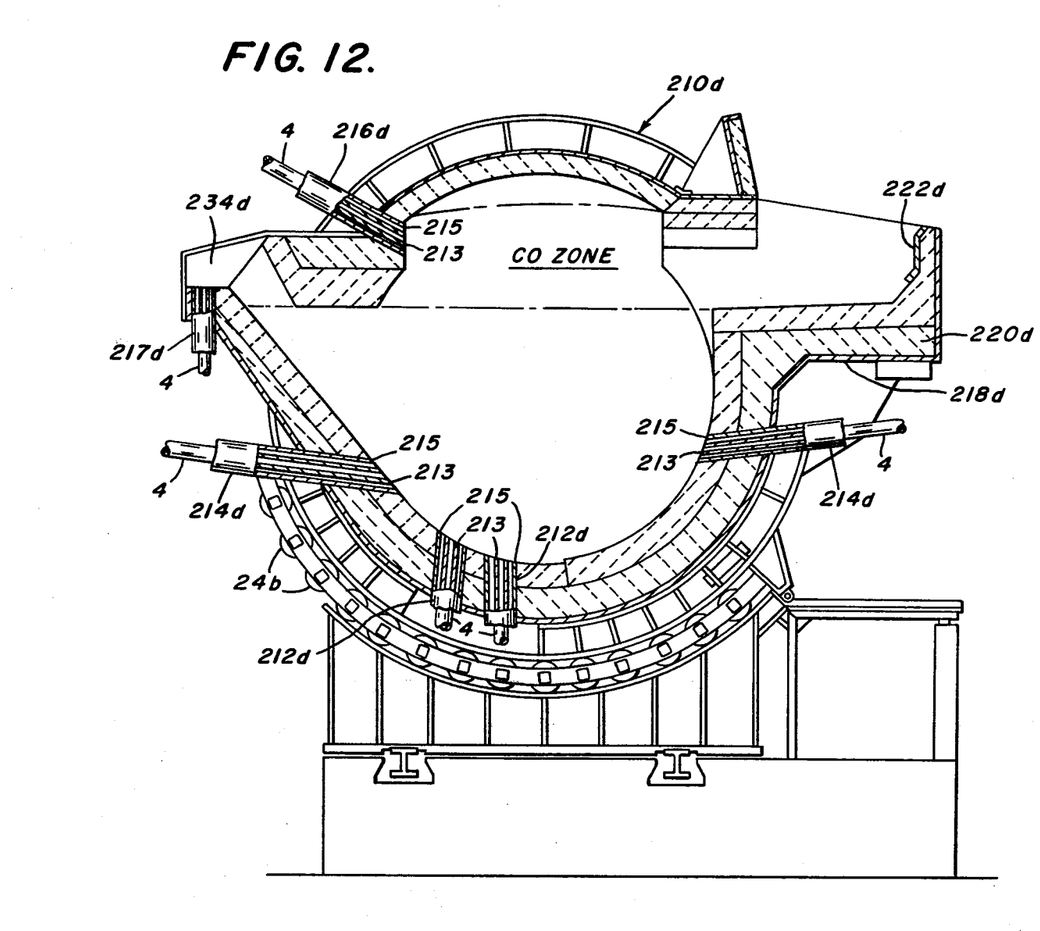
FIG. 12 is a vertical sectional view of an oscillatable hot metal mixer having an inclined bottom and vertical bottom submerged tuyeres, a pair of side submerged tuyeres and a side tuyere directed toward the carbon monoxide zone of the mixer.

In FIG. 12, the present invention is employed with a hot metal mixer 210d having a shell 218d provided with a refractory lining 220d, and having also an inlet mouth 222d and a pouring spout 234d. The mixer 210d is oscillatable on rollers 246d between the charging and discharging positions. Such mixer 210d has vertical bottom submerged tuyeres 212d, side submerged tuyeres 214d, a side tuyere 216d directed toward the carbon monoxide zone (CO zone) of the mixer 210d and a spout tuyere 217d. The tuyeres 212d, 214d, 216d, 217d are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar (CaF$_2$) or the like), or a blocking or deoxidizing agent (ferro manganese or the like), and in an outer pipe 215, a shroud gas, such as propane, natural gas, light fuel oil or the like.

A discharge tuyere or tuyeres 217 (FIG. 8), 217a (FIG. 9), 217b (FIG. 10), 217c (FIG. 11), 217d (FIG. 12) is disposed adjacent a discharge opening such as the mouth 222 (FIG. 8); the pouring spouts 234 (FIG. 9); 234b (FIG. 10); 234c (FIG. 11); and 234d (FIG. 12) to prevent the formation of skulls adjacent or on the discharge opening during the pouring operation, particularly those chromium-nickel skulls produced during the refining of stainless steel.

Method

A method for use with a steel-refining apparatus comprising a converter 210 (FIGS. 1, 8), a supply 2 of fluid, a primary conduit 4 coupled between the converter 210 and the fluid source 2 for supplying fluid to the converter 210 and a secondary conduit 6 having its input and output coupled to upstream and downstream portions of the primary conduit 4 between the converter 210 and the supply 2, and a pressure tank 12 containing a powdered flux to be supplied to the converter 210, the method including the steps of:

a. pressurizing the tank 12 to a predetermined pressure;

b. establishing a flow of the fluid through the secondary conduit 6;

c. supplying flux from the tank 12 to the secondary conduit 6 after the tank 12 has been pressurized in step (a); and fluid flow has been established in step (b);

d. measuring the difference in pressure between the tank 12 and the primary conduit 4; and e. controlling the pressure supplied to the tank 12 in step a. to thereby control the rate at which flux is supplied to the secondary conduit 6 from the tank 12 as a function of the pressure differential between the primary conduit 4 and the tank 12.

The method includes the further steps of:

f. measuring the rate at which flux is supplied to the secondary conduit 6 from the tank 12;

g. comparing the rate measured in step (f) with a preset reference rate;

h. comparing the output of step (g) with the measured pressure differential of step (f); and i. controlling the pressure supplied to the tank 12 in step a. by the output of step (h)

The method alternatively includes the further steps of:

j. measuring the amount of flux supplied to the secondary conduit 6 from the tank 12;

k. comparing the measured amount with a preset reference amount; and l. shutting off the supply of flux from the tank 12 to the secondary conduit 6 in step (c) when the difference between the measured and reference amounts reaches a predetermined value.

While in accordance with the patent statutes a preferred and alternative embodiments of this invention have been illustrated and described in detail, it is to be particularly understood that the invention is not limited thereto or thereby.

What is claimed is:

1. A method for use with a steel-refining apparatus comprising a converter, a supply of fluid, a primary conduit coupled between said converter and said fluid source for supplying fluid to said converter and a secondary conduit having its input and output coupled to upstream and downstream portions of said primary conduit between said converter and said supply, and a pressure tank containing a powdered flux to be supplied to said converter, said method including the steps of:
 a. pressurizing said tank to a predetermined pressure;
 b. establishing flow of said fluid through said secondary conduit;
 c. supplying flux from said tank to said secondary conduit after said tank has been pressurized in step a. and fluid flow has been established in step (b);
 d. measuring the difference in pressure between said tank and said primary conduit; and
 e. controlling the pressure supplied in said tank in step a. to thereby control the rate at which flux is supplied to said secondary conduit from said tank as a function of the pressure differential between said primary conduit and said tank.

2. The method according to claim 1, including the further steps of
 f. measuring the rate at which flux is supplied to said secondary conduit from said tank;
 g. comparing the rate measured in step (f) with a preset reference rate;
 h. comparing the output of step (g) with the measured pressure differential of step (f); and
 i. controlling the pressure supplied to said tank in step (a) by the output of step (h).

3. The method according to claim 1, including the further steps of:
 f. measuring the amount of flux supplied to said secondary conduit from said tank;
 g. comparing said measured amount with a preset reference amount; and
 h. shutting off the supply of flux from said tank to said secondary conduit in step (c) when the difference between said measured and reference amounts reaches a predetermined value.

4. The method recited in claim 1 wherein said converter is a Q-BOP converter.

5. The method recited in claim 1 wherein said converter is an open hearth converter.

6. The method recited in claim 1 wherein said converter is an electric furnace.

7. The method recited in claim 1 wherein said converter is a tiltable open hearth furnace.

8. The method recited in claim 1 wherein said converter is a hot metal mixer.

9. The method recited in claim 1 and including the steps of:
 a. shutting off said pressure tank; and
 b. actuating another pressure tank containing a powdered flux to supply said flux to said converter.

* * * * *